Nov. 21, 1967  E. C. SCHROM  3,354,344
FLUID-WORKING SPARK DISCHARGE ELECTRODE ASSEMBLY
Filed March 8, 1967
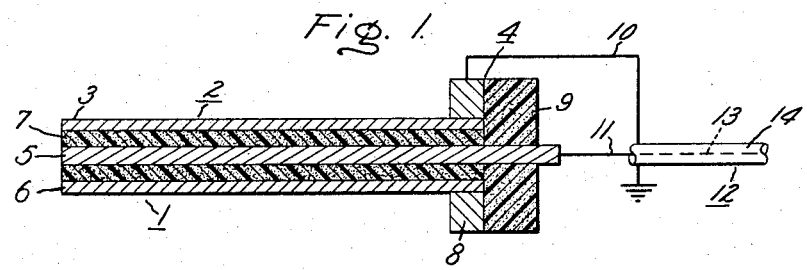
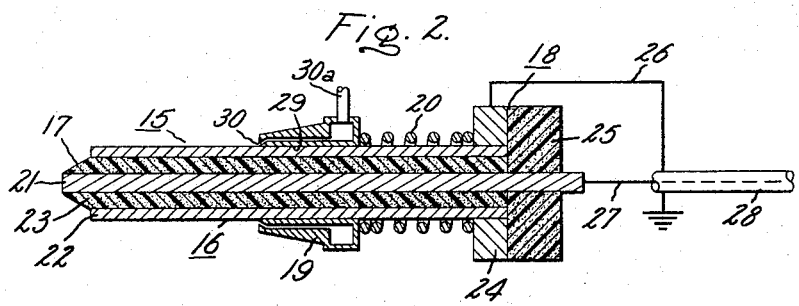
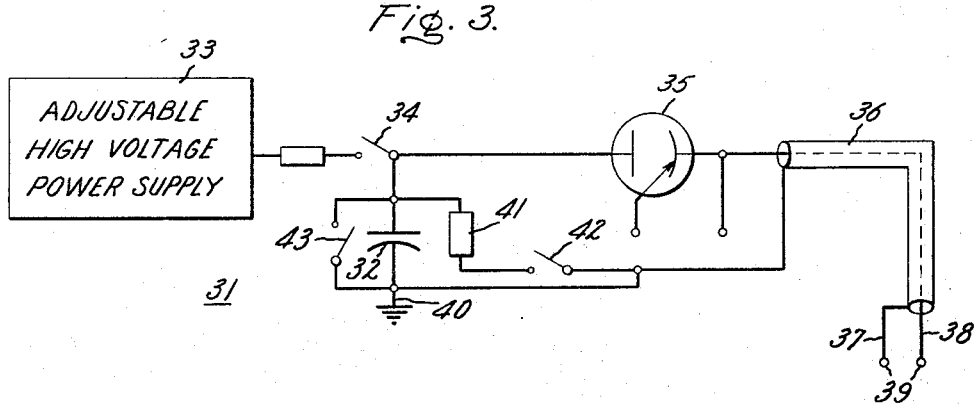
Inventor:
Edward C. Schrom,
by John F. Medwitt
His Attorney.

United States Patent Office 3,354,344
Patented Nov. 21, 1967

3,354,344
FLUID-WORKING SPARK DISCHARGE
ELECTRODE ASSEMBLY
Edward C. Schrom, Schenectady, N.Y., assignor to
General Electric Company, a corporation of New
York
Filed Mar. 8, 1967, Ser. No. 641,076
10 Claims. (Cl. 313—130)

ABSTRACT OF THE DISCLOSURE

An electrode assembly for use in the repetitive production of electrohydraulic shock waves is disclosed which comprises a rod-like conductive element concentrically positioned within and coextensive with a tubular conductive element having an inner transverse dimension which is greater than the transverse dimension of the central element. The space between the two elements is completely occupied by an insulating material composed of a particulate ceramic material flexibly bonded together and to the surfaces of said elements by an elastomeric material. One end portion of the so-assembled elements constitutes a working face portion adapted to be immersed in a substantially incompressible working fluid and for repetitive electrical discharges to occur between said inner and outer elements for the generation of shock waves in said fluid.

---

This application is a continuation-in-part of application Ser. No. 323,362 of the present inventor, filed Nov. 13, 1963, now abandoned, entitled, "Electrode" and assigned to the assignee of this application.

The present invention relates generally to an improved electrode assembly for electrohydraulic systems. More particularly, the present invention is directed to an electrode construction for repetitively generating spark discharge in electrohydraulic systems.

Electrohydraulics is a known concept for converting electrical energy to useful work which already finds application in the mechanical forming of metals. The general mechanism converts energy from a spark discharge into a steep pressure wave that is transmitted through surrounding working fluid which is substantially incompressible to supply a working force. The force is of sufficient magnitude to form metal members in communication with the fluid by such operations as forging, hole drilling, bending, and the like. Other diversified applications suggested for electrohydraulics include rock crushing, pile driving, material compaction, and vibratory devices.

Past electrode configurations for electrohydraulic systems consist of opposed pole members defining a gap therebetween in which the spark is generated. A metal foil element is connected between the electrode pole members to establish a low resistance conducting path for spark initiation. To generate the spark, high voltage electrical energy is transmitted through the foil causing metal vaporization and establishing an ionized zone in the gap between pole members. The electrical energy is generally obtained from an associated capacitor discharge circuit which delivers a pulse to one pole member of the electrode while the second pole member of said electrode is maintained at lower energy potential, usually ground. Upon vaporization of the electrode foil element, the high voltage energy produces a spark between pole members for the duration of gap ionization and energy flow. Gap ionization is a highly transitory state with a single short spark being produced and the foil element must be replaced in conventional electrodes for each additional discharge. In many work operations, the desired final result is more readily and conveniently obtained with repeated energy application. Not only is a single discharge often insufficient for the total work to be done but multiple discharge usually provides better means to control, regulate, and adjust energy transfer to the workpiece.

It is one important object of the invention, therefore, to provide an electrode assembly which permits rapid repetitive spark discharges in electrohydraulic systems.

It is another important object of the invention to provide a repetitive spark discharge electrode assembly for electrohydraulic systems having associated therewith supply means for the working fluid.

These and other important objects and advantages of the invention will be apparent from the following description, taken in connection with the accompanying drawings in which:

FIGURE 1 represents schematically one electrode assembly embodiment of the invention having suitable electrical connections thereto;

FIGURE 2 represents schematically a different electrode assembly of the invention; and FIGURE 3 is a schematic electrical diagram representing a low impedance discharge circuit for supplying high voltage energy to the electrode assembly.

Briefly, a spark discharge electrode assembly is provided which comprises a longitudinally extending solid rod of electrically conductive material, a hollow coaxial sheath of electrically conductive material substantially coextensive with the rod in length and having an internal opening larger than the transverse rod dimensions to define an annular space with the rod, and solid dielectric spacer means occupying the annular space area so as to bond the sheath to the rod and form a continuous solid construction for the length of the electrode. The dielectric spacer means of the electrode are fabricated from a plurality of flexibly bonded ceramic particles having substantially the same erosion characteristics as the conductive materials in the construction during spark discharge. The electrode assembly generates a spark between exposed ends of the central rod and surrounding sheath element with each pulse of the operatively associated high energy electrical circuit.

Several important characteristics distinguish the electrode assembly construction above defined from other known electrode assemblies. Bonded construction of the individual elements in the present member imparts general shock resistance to prevent mechanical failure upon repeated pressure wave generation. Absence of any opening at the working end of the present electrode assembly eliminates location where a pressure wave could preferentially stress the member during operation. The relatively imperforate nature of the entire construction prevents penetration by working fluid with undesirable internal propagation of the shock wave. The flexibly bonded ceramic spacer also imparts superior thermal behavior to the electrode assembly compared to known arrangements. More particularly, the construction resists thermal shock accompanying operation and allows uniform erosion of the working tip with repeated sparking action. Uniform erosion of the electrode tip is desirable to help insure successive spark generation with duplicate pressure wave characteristics for improved process control. A ceramic composition which is a dense solid refractory in particulate form achieves these results and may be readily fabricated with a flexible binder into the desired component. When bonded to adjoining surfaces in the separation area, the ceramic composition provides mechanical reinforcement for the entire electrode construction. Suitable binders for the ceramic particles can be selected from the general class of flexible adhesives for all materials to be joined. A flexible binder provides better shock absorption than can be obtained with brittle glassy adhesives, hence helps preserve the integrity of the bonded construction in the electrohydraulic environment. Additional reinforcement of the dielectric spacer means is contemplated wherein one or more filamentary materials of dielectric character such as glass cloth, continuous fibers, and the like, can also be disposed in the separation area.

The electrical characteristics of the electrode assembly are particularly important for extended service under conditions of rapidly repeated discharge cycles. While single spark generation in the electrohydraulic system is of short duration and does not cause erosion of the electrode assembly working tip, rapid discharge repetition produces eventual thermal erosion and forms cumulative electrical stresses which promote dielectric failure at weak points along the electrode assembly length. The electrodes become heated to higher temperatures with successive pulses which further aggravates the problem of dielectric failure in the electrode assembly. To sustain rapid discharge cycling, the insulation must exhibit uniform dielectric values along its complete length including freedom from voids, discontinuities, and the like. It will also be desirable to minimize electrical inductance in the electrode assembly at the elevated operating voltages thereby avoiding localized heating as well as general power loss. For the latter reasons, the present electrode assembly comprises a coaxial configuration of pole members preferably being equi-spaced from each other. The distance separating the coaxially orientated pole members is selected to yield the lowest inductance losses for the particular discharge voltage of the associated electrical circuit. To promote greater efficiency of energy conversion, it will be desirable to reduce the remaining impedance as much as possible. This may be accomplished in large measure by selection of good electrical conductors for the pole elements in the aforementioned coaxial configuration. Low surge impedance in the electrode assembly also promotes more efficient energy conversion by single spark formation with each pulse of the circuit. Spark interruption during a single pulse followed by re-ignition and discharge at lower energy levels over an oscillatory period drains useful energy from the initial work force available.

An electrode assembly exhibiting all the aforementioned desirable characteristics is depicted in FIGURE 1 including suitable connections for an associated high energy electrical circuit. Accordingly, electrode assembly 1 generally comprises a longitudinally extending body 2 with a working tip portion 3 at one end and electrical termination portion 4 disposed at the opposite end. The electrode assembly is a bonded construction of solid electrically conducting rod 5 located at the center axis of the member and extending its entire length, conducting cylindrical sheath 6 of larger internal diameter than the rod and disposed coaxially with respect thereto, and dielectric spacer means 7 occupying the annular separation area between said conducting elements. Suitable spacer means may comprise dispersion of particulate ceramic material in a suitable liquid binder which can be solidified in the separation area to form a continuous dielectric for the length of the electrode assembly. Working tip portion 3 of the electrode assembly is formed by adjacent ends of the conducting elements interconnected with bonded ceramic spacer means and may terminate in a flat face perpendicular to the central axis of the electrode assembly. Terminal portion 4 of the electrode assembly consists of a conductive ring 8 affixed directly to the outer surface of sheath element 6, dielectric bushing means 9 separating said ring element from the adjacent end of center conducting rod 5, and electrical leads 10 and 11 for connecting the electrode assembly to a suitable high voltage discharge circuit. Preferably, said electrical leads make connection with a coaxial power cable 12 having center conductor 13 carrying the electrical current from the circuit, with surrounding conductor 14 providing a return path from the electrode assembly to a common ground for said circuit. The dimensions of bushing 9 provide longer path length between conducting elements than the annular distance therebetween to minimize arcing at the bushing. It will also be advantageous to have matched impedance characteristics in the power cable and electrode assembly for greater energy conversion efficiency in accordance with the principles previously indicated.

In operation, the working tip of the electrode assembly contacts a non-compressible dielectric working fluid for generation of a spark discharge with each pulse of the associated electrical circuit. A useful arrangement includes submersion of the entire electrode assembly along with at least a portion of the powder cable in the non-compressible liquid whereby shock waves produced upon discharge are communicated to a workpiece also in contact with the liquid. A known workpiece orientation for utilizing the energy conversion comprises a mold cavity sealed with a metal blank in contact with the hydraulic working medium. The amount and rate of energy delivery to the workpiece with the present electrode assembly depends upon discharge characteristics of the electrical circuit as well as ionization properties of the working fluid. Losses include circuit impedance and the amount of energy needed to ionize the working fluid at the electrode assembly tip. With the preferred capacitor discharge circuit hereinafter more fully described, the amount of energy delivered to the electrode assembly is based upon the following relationship $$J = \tfrac{1}{2} C V^2$$

where J is the electrical energy in joules or watt seconds, C is the capacitance in farads of the circuit, and V the voltage. The preferred arrangement controls the amount of energy to the electrode assembly by voltage variation.

In FIGURE 2 there is shown a different embodiment of the present coaxial electrode assembly configuration. The schematic view, partially in cross section, illustrates an electrode assembly with supply means for the working fluid which is particularly adaptable for use in the field where it may be desirable to apply electrohydraulic shock energy to bodies of material in situ, for example, in the breaking of rock formations. The assembly 15 comprises an electrode assembly 16 with working tip portion 17 and terminal portion 18, liquid supply means 19 slidably mounted on the exterior surface of the electrode assembly and spring means 20 interposed between the terminal portion 18 of the electrode assembly and said liquid supply means 19. Tip portion 17 of the electrode is conically shaped to secure certain operating characteristics not as readily obtained in any other manner. The sloping dielectric solid provides greater gap spacing for discharge across the working face of the member at a given annular distance between the conducting elements. The longer spacing increases peak pressure of the shock wave generated upon discharge so that an advantage is gained without having to increase the lateral dimensions of the electrode assembly. The face angle of the working tip with respect to the central axis of the electrode assembly also influences the shape and direction of the shock wave upon discharge. A protruding conical tip is considered preferable over a flat face or other configuration for ability to produce a more narrow shock wave in the working fluid and offer better possibility to provide shock wave reinforcement upon rapid multiple discharge. Thus, the dimensions and angle of the conical electrode assembly tip define an angular face which is proportioned to regulate the spark discharge. Bonding of conducting elements 21 and 22 in the assembly with dielectric spacer means 23 can be achieved conveniently in the same manner previously described for FIGURE 1. The bonded assembly thereby comprises a single unitized construction with dielectric means occupying the separation area between conducting elements along the entire electrode assembly length. Terminal portion 18 of the electrode assembly may again have connector means 24 affixed directly to the outer conducting element, dielectric bushing means 25 electrically separating adjacent ends of the conducting elements, and electrical leads 26 and 27 extending to a coaxial power cable 28.

In accordance with the above teachings, a repetitive spark discharge electrode assembly may be fabricated by locating a one-quarter inch diameter metal rod along the longitudinal center axis of a one-eighth inch wall, one inch outside diameter metal tube. The annular separation area between cylindrical elements may be completely filled with approximately equi-part mixture of powdered ceramic and a liquid elastomer-catalyst composition. Cure of the mixture to the completely solid condition produces void-free dielectric means between the conducting elements along the entire length of the electrode assembly. Shaping of the electrode assembly working face into the desired conical configuration defined by a protruding rod tip interconnected with solid dielectric sloping to the adjacent sheath end may thereafter be accomplished when convenient. To fabricate the terminal portion of the electrode assembly, a metal ring 24 is fitted over one end of the metal tube and attached directly thereto by conventional joining techniques such as brazing and the like. The terminal end of the electrode assembly is completed with attachment of bushing element 25. Electrical connectors may now be fastened directly to the metal ring element and protruding adjacent end of the brass rod to complete the electrical termination of the assembled electrodes. Compressive spring element 20 is next slipped over the metal tube and a preassembled ring-shaped water jacket with an internal opening 29 slightly larger than the outside diameter of the metal tube is next slidably mounted on the electrode assembly and provides a frusto-conical sealing surface, as shown. Passageway 30 leading exteriorly from the water jacket furnishes means on the electrode assembly for supplying working fluid to the working tip after connection at inlet opening 30a to a suitable source of the medium.

As an example of how the assembly of FIGURE 2 may be used to break rock formations, a hole is drilled into the rock to be broken having a diameter which is larger than the smaller diameter of the frusto-conical portion of member 19 but smaller than the larger diameter of said portion, and of sufficient depth to accommodate the working end portion of the electrode assembly 15 without bottoming. The electrode assembly is inserted in the hole and working fluid is pumped into the hole through supply passage 30 from a suitable supply through conduit 30a. Air is permitted to escape by maintaining a slight gap between the frusto-conical surface of member 19 and the edge of the drilled hole until the hole is filled with the working fluid. Thereupon, the assembly is firmly pushed into the hole compressing spring 20 and forming a seal between the frusto conical surface and the peripheral edge of the drilled hole. Electrical discharges produced across the working tip generate shock waves in the entrapped working fluid which fractures the surrounding rock.

In FIGURE 3 there is shown a schematic electrical diagram of a suitable capacitor discharge circuit for energizing the above electrode assembly configuration to provide repetitive discharge. A detailed description of the particular circuit chosen for illustration appears in U.S. Patent No. 3,234,429, entitled "Electrical Circuit for Electrohydraulic Systems," issued on February 8, 1966, and assigned to the assignee of the present invention. Generally, electrical circuit 31 charges capacitor element 32 to the desired voltage level from an adjustable high voltage power supply 33 whereupon switch element 34 may be opened, disconnecting the power supply from the capacitor as a safety precaution to prevent stored energy from being returned to said power supply. Upon discharge of the capacitor element, the stored energy is discharged through a three-electrode rectifier element 35 to coaxial power cable 36. An electrode of the invention is serially connected to the remote end of the power cable with energized conductor 38 of the power cable connecting center rod element of the electrode and ground conductor 37 of the power cable connecting the electrode sheath. Electrode connection to the circuit may be obtained at circuit terminal elements 39. The complete discharge path of the circuit for spark discharge comprises the serially connected capacitor, three-electrode tube, power cable, and electrode with electrical return from the electrode being made to ground connection 40 in the circuit. Capacitor element 32 of the circuit is shown connected to current limiting resistor 41 for relief of the residual capacitor charge after discharge through the rectifier element 35 upon closure of switch 42. The time of residual charge dissipation may be shortened by closing second switch 43 in a particular time sequence after closure of switch 42. In repetitive discharge, the mentioned switch elements are normally operated only upon termination of the final discharge cycle.

The preferred construction materials for conducting elements in the present electrode comprise metals of high electrical conductivity such as copper, brass, and steel having sufficient mechanical strength to withstand repeated shock vibration. Preferred dielectrics for separating the conducting elements of the electrode are dense refractory materials such as alumina, zirconia, and calcium carbonate. Less dense ceramics such as asbestos and glass fiber should also prove useful dielectrics at lower electrical stress of the electrode. With any ceramic insulation, however, it will be necessary to minimize voids in the final solid to prevent dielectric breakdown and entry points for the working fluid. Thus, the dielectric must be relatively impervious to wetting in order to avoid liquid impregnation of the electrode. The flexible bond formed between the ceramic particles and the inner and outer electrodes is quite critical with respect to its hardness. If the polymeric material used is too hard, it will fracture in use. If it is too soft, repeated shock waves will tear the material. In this respect, it has been found that a durometer hardness of between 50 and 150 measured on the Shore "A" scale and preferably from about 80 to 90 is desirable. Furthermore, it should be highly flexible and capable of from 300 to 500 percent elongation. In addition, the material should be resistant to attack by the plasma and/or chemically reactive species generated during the electrical discharge. Additionally, as a dielectric, it should exhibit a dissipation factor of from about 0.07 to about 0.08. Preferably, the material should be castable in order to minimize or eliminate voids. In practice, it has been found that a mixture of ceramic particles and binder in the proportion of from about 40 to 60 percent by volume of ceramic to about 60 to 40 percent by volume binder is satisfactory, with a preferred composition of about 50 volume percent fused alumina particles and about 50 volume percent of a polyurethane rubber having a durometer hardness of about 90.

More specifically, and by way of example, "Adiprene L-100," a liquid polyurethane rubber manufactured by E. I. duPont de Nemours and Co., Inc., of Wilmington, Del. was heated to about 80° F. and about 1200 grams were placed in a container along with 12 drops of "Antifoam," a silicone anti-foaming agent manufactured by the General Electric Company. The rubber was placed in a dessicator and subjected to a rough vacuum until no bubbles remained in the liquid rubber. An equal volume of "Alundum" (a fused alumina ceramic manufactured by the Norton Company) particles of about 100 mesh size or smaller was added to the rubber and the mixture again pumped down to remove all air bubbles. About 324 grams of a curing agent "Furane 977B" manufactured by the Furane Plastics Company was then stirred into the mixture and the mixture was again vacuum deaerated. This mixture which was in the form of a flowable slurry was then injected into the space between the central electrode 5 and the outer concentric tubular electrode 6, care being taken to avoid the formation of voids therein. The assembly was permitted to remain at room temperature for 24 hours and then cured by heating in an oven at 80° C. for 8 hours. The resulting composite insulating material was void-free, firmly bonded to both electrodes and the binder had a durometer hardness of 90 measured on the Shore "A" scale.

Many electrode assemblies have been made utilizing flexibly bonded particulate ceramic particle insulators and have been found to be capable of withstanding from about 2,000 to 3,000 discharges at 2,000 joules, or from about 400 to 800 discharges at 30,000 to 45,000 joules. The mode of failure is by the gradual formation of a crazed surface where the insulator material is exposed to the working fluid and generated plasma. This is a surface phenomenon and by removing the crazed surface, the electrode may be restored to its original condition. When the insulator was made from conventionally fired ceramic bodies without the flexible bond, the ceramic bodies invariably fractured after only a single discharge. Fired ceramic insulator bodies formed from "Pyroceram," a high strength ceramic manufactured by the Corning Glass Works of Corning, N.Y., mullite, steatite, and an otherwise unidentified aircraft spark plug ceramic were tried without success.

From the foregoing description, it will be apparent that a general electrode configuration of improved utility for electrohydraulic application has been provided. It is not intended to limit the invention in the preferred embodiments above shown, however, since it will be obvious to those skilled in the art that certain modifications of the present teachings can be made without departing from the true spirit and scope of the invention. Thus, where lesser electrical stress be applied to the electrode assembly, it may be possible to further reduce the ceramic nature of the dielectric spacer means to a composition which does not readily disintegrate in the environment. On the other hand, when the applied electrical stress to the electrode assembly is severe, it may prove desirable to include dielectric reinforcement such as filaments in the dielectric composition. It is intended to limit the present invention, therefore, only to the scope of the following claims.

What I claim as new and desire to secure by Letters Patent of the United States is:

1. A spark discharge electrode assembly having a working tip portion immersed in a substantially non-compressible working fluid and a terminal portion, which comprises a longitudinally extending metal rod, a hollow coaxial metal sheath concentrically positioned with respect to and substantially coextensive with said rod to define a continuous annular space, solid dielectric means occupying said annular space flexibly bonding said sheath to said rod to form a unitary solid construction for substantially the entire length of the electrode assembly, said dielectric means comprising a plurality of particles of an insulating fired ceramic material flexibly bonded together by an elastomeric organic dielectric material having a durometer hardness of from about 50 to 150 measured on the Shore "A" scale to form a composite insulating body having substantially the same erosion characteristics during use as the conductive metal members, said terminal portion being disposed at the opposite end of said electrode assembly from said working tip and comprising an electrically conductive ring member affixed directly to the outer surface of said sheath member, and dielectric bushing means in contact with and separating said ring member from the adjacent end of said metal rod.

2. An electrode assembly as set forth in claim 1 wherein said durometer hardness has a value between about 80 and 90.

3. An electrode assembly as set forth in claim 1 wherein said elastomeric material has an elongation of between 300 and 500 percent.

4. An electrode assembly as set forth in claim 1 wherein said dielectric means has a dissipation factor between about 0.07 and 0.08.

5. An electrode assembly as set forth in claim 1 wherein said insulating fired ceramic particles are composed of alumina.

6. An electrode assembly as set forth in claim 1 wherein said elastomeric organic dielectric material is a polyurethane rubber.

7. An electrode assembly as set forth in claim 1 wherein said working tip portion comprises a conically-shaped end portion formed by a protruding rod tip interconnected with said dielectric means sloping to the adjacent sheath end to define an angular face.

8. An electrode assembly as set forth in claim 1 wherein a liquid supply means is slidably mounted on the exterior surface of said sheath.

9. An electrode assembly as set forth in claim 8 wherein said liquid supply means is provided with a frusto-conical sealing surface.

10. An electrode assembly as set forth in claim 8 wherein said liquid supply means is provided with biasing means urging said liquid supply means toward said working tip.

No references cited.

ROBERT SEGAL, *Primary Examiner.*